United States Patent Office 3,462,441
Patented Aug. 19, 1969

3,462,441
BIS(PYRIDYLETHYL)- AND BIS(PIPERIDYL-ETHYL)-INDOLES
Meier E. Freed, Philadelphia, and John L. Archibald, Malvern, Pa., assignors to American Home Products Corporation, New York, N.Y., a corporation of Delaware
No Drawing. Filed Jan. 3, 1966, Ser. No. 518,007
Int. Cl. C07d 57/00; A61k 27/00
U.S. Cl. 260—293                        10 Claims

---

ABSTRACT OF THE DISCLOSURE

The compounds are bis(pyridylethyl)- and (piperidylethyl) indoles which are useful as anticonvulsants.

---

This invention relates to disubstituted indole derivatives and more particularly to bis(pyridylethyl)indoles and bis (piperidylethyl)indoles having pharmacological activity.

The novel compounds included within the scope of this invention are represented by the following formula:

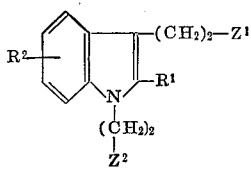

wherein $R^1$ is selected from the group consisting of hydrogen, alkyl, and phenyl; $R^2$ is selected from the group consisting of hydrogen, alkyl, alkoxy, hydroxy and halogen; $Z^1$ and $Z^2$ are each selected from the group consisting of 2- and 4-pyridyl, and 2- and 4-piperidyl moieties having a structure selected from the following:

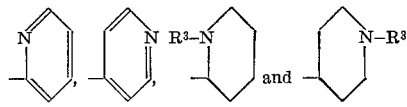

wherein $R^3$ is selected from the group consisting of hydrogen, alkyl, aralkyl, aroylalkyl and hydroxyalkyl.

The novel compounds of the present invention wherein $Z^1$ and $Z^2$ are 2- and/or 4-pyridyl moieties are generally prepared by reacting in a closed system, a selected 3-[2-(pyridyl)-ethyl]-indole with a selected 2- or 4-vinylpyridine compound, in the presence of metallic sodium and cupric sulfate, in an intert organic solvent. To obtain the 1,3 - bis[2 - (piperidyl)ethyl]indoles of the invention, the corresponding 1,3-bis[2-(pyridyl)ethyl]indoles, may first be obtained by the general procedure referred to just previously. The latter pyridylethylated indole derivatives may be reduced by standard procedures, such as catalytic hydrogenation in the presence, for example, platinum oxide, in a suitable reaction medium; e.g., glacial acetic acid, to obtain the desired piperidylethylated indole derivatives. The 1,3-bis[2-(piperidyl)ethyl]-indoles of the invention, wherein the respective N atoms of the piperidyl moieties are substituted by alkyl, or hydroxyalkyl; may be obtained by further reacting a 1,3-bis[2-(piperidyl)ethyl]indole, which may be prepared by the procedures described previously above, with a suitable aldehyde, by refluxing the piperidylethylated indole and aldehyde in the presence of formic acid. When the compounds of the invention are desired wherein the N atoms of the piperidyl moieties are substituted by aralkyl or aroyl, the bis-(piperidylethylated) indole is reacted with a suitable halide of the selected aralkyl or aroyl compound in the presence of an halogen acceptor, such as triethylamine.

The conditions for the above reactions may be varied in accordance with standard procedures. Merely by way of example, it has been found that the initial reaction between the selected indole and the chosen vinylpyridine compound may occur in a bomb maintained in an oil bath at about 150° C. for from about 3 to 5 hours.

With respect to the reactants, many of them are known compounds which are readily available from commercial sources. Others which are not commercially available can be prepared in accordance with standard organic procedures which are known to those skilled in the art.

It has been discovered that compounds of this invention meeting the required qualifications have valuable pharmacological properties in that they function as central nervous system agents, particularly as anti-convulsants.

When the compounds of this invention are employed as central nervous system agents, particularly as anti-convulsants; they may be administered alone or in combination with pharmacologically-acceptable carriers, the proportion of which is determined by the solubility and chemical nature of the compound, chosen route of administration and standard pharmaceutical practice. For example, they may be administered orally in the form of tablets or capsules which may contain conventional excipients, or in the form of solutions; or they may be injected parenterally, that is intramuscularly, intravenously or subcutaneously. For parenteral administration they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 2 mg. to about 100 mg. per day, although as aforementioned variations will occur, however, a dosage level that is in the range of from about 10 mg. to about 40 mg. per day is most desirably employed in order to achieve effective results.

The following examples are given by way of illustration and are not to be construed as limitations of this invention, many variations of which are possible without departing from the scope and spirit thereof. Thus, as will readily appear to those skilled in the art, the pharmaceutically acceptable acid-addition salts of the desired compounds are similarly useful therapeutically, and may be prepared by conventional procedures, as also exemplified hereinafter.

EXAMPLE I 2-methyl-1,3-bis[2-(4-pyridyl)ethyl]indole

A mixture of 11.8 g. of 2-methyl-3-[2-(4-pyridyl)-ethyl]indole, 10.5 g. of 4-vinylpyridine, 0.1 g. of sodium, and 0.1 g. of cupric sulfate, in 10 ml. of ethanol, was heated in a steel bomb tube (capacity 45 ml.), in an oil bath at 150° for 5 hours. The cooled reaction mixture was diluted with a little ethanol and filtered. The filtrate crystallized on standing. Recrystallization from aqueous ethanol gave the product as colorless needles (9.1 g.), M.P. 140–142°. Two further recrystallizations gave an analytical sample, M.P. 141–2°.

*Analysis.*—Calcd. for $C_{23}H_{23}N_3$: C, 80.90; H, 6.79; N, 12.31. Found: C, 81.09; H, 6.78; N, 12.52.

EXAMPLE II

1,3-bis[2-(4-pyridyl)ethyl]indole

Following the procedure of Example I, but substituting an equivalent amount of 3-[2-(4-pyridyl)ethyl]-indole as the pyridylethylated indole reactant, the title compound was obtained as colorless prisms, M.P. 100–102°.

*Analysis.*—Calcd. for $C_{22}H_{21}N_3$: C, 80.70; H, 6.47; N, 12.84. Found: C, 80.35; H, 6.35; N, 12.72.

EXAMPLE III

5-methoxy-1,3-bis[2-(4-pyridyl)ethyl]indole

A mixture of 5-methoxy-3-[2-(4-pyridyl)ethyl]indole (2.52 g.), 4-vinylpyridine (2.1 g.), sodium (0.1 g.), cupric sulfate (0.02 g.), and ethanol (10 ml.), was placed in a 45 ml. steel bomb tube and heated in an oil bath at 150° for 3 hours. The cooled mixture was diluted with ethanol and filtered. Evaporation of the filtrate gave a yellow oil, which crystallized after one week. It was spread on a porous plate to provide colorless needles (500 mg.), M.P. 79–82°. Two recrystallizations from ethyl acetate-hexane gave analytically pure product, M.P. 81–3°.

*Analysis.*—Calcd. for $C_{22}H_{23}N_3O$: C, 77.28; H, 6.49; N, 11.76. Found: C, 77.35; H, 6.63; N, 11.95.

EXAMPLE IV

2-methyl-1,3-bis[2-(4-piperidyl)ethyl]indole 2-methyl-1,3-bis[2-(4-pyridyl)ethyl]indole (3.2 g.) was suspended in water (10 ml.) and ethanol (8 ml.) and made just acid with HCl. Platinum oxide (0.25 g.) was added and the mixture was hydrogenated for 18 hours at 46 p.s.i. The catalyst was filtered off and the filtrate was evaporated. The residue was diluted with water, basified and extracted with methylene chloride. Evaporation of the dried ($MgSO_4$) extract gave an oil which was dissolved in ether and made just acid with ethereal HCl. The resulting precipitate was boiled with ethanol and filtered off to provide the product as its dihydrochloride (1.6 g.) M.P. 340–345° (d.).

*Analysis.*—Calcd. for $C_{33}H_{35}N_2 \cdot 2HCl$: C, 64.77; H, 8.75; N, 9.85; Cl, 16.63. Found: C, 64.42; H, 8.64; N, 9.71; Cl, 16.6.

EXAMPLE V

2-methyl-1,3-bis[2-(1-methyl-4-piperidyl)ethyl]indole

The reduction product of Example IV is reacted with formaldehyde and formic acid to obtain the title compound.

EXAMPLE VI

4-ethyl-1-[2-(2-pyridyl)ethyl]-3-[2-(4-pyridyl)ethyl]indole

Following the procedure of Example I, 4-ethyl-3-[2-(4-pyridyl)ethyl]indole is reacted with 2-vinylpyridine to obtain 4-ethyl-1-[2-(2-pyridyl)ethyl]-3-[2-(4-pyridyl)ethyl]indole.

EXAMPLE VII

2-ethyl-6-chloro-1-[2-(4-pyridyl)ethyl]-3-[2-(2-pyridyl)ethyl]indole

Again following the procedure of Example I, 2-ethyl-6-chloro-1-[2-(4-pyridyl)ethyl]-3-[2-(2-pyridyl)ethyl]indole is obtained by the reaction of 2-ethyl-6-chloro-3-[2-(2-pyridyl)ethyl]indole with 4-vinylpyridine.

EXAMPLE VIII

7-hydroxy-1,3-bis[2-(2-pyridyl)ethyl]indole

Following the procedure of Example I, 7-hydroxy-3-[2-(2-pyridyl)ethyl]indole is reacted with 2-vinylpyridine to obtain 7-hydroxy-1,3-bis[2-(2-pyridyl)ethyl]indole.

EXAMPLE IX

1-[2-(2-piperidyl)ethyl]-3-[2-(4-piperidyl)ethyl]indole

By the procedure of Example I, 3-[2-(4-pyridyl)ethyl]indole is reacted with 2-vinylpyridine to prepare 1-[2-(2-pyridyl)ethyl]-3-[2-(4-pyridyl)ethyl]indole. The latter compound is then reduced by the method of Example IV to give 1-[2-(2-piperidyl)ethyl]-3-[2-(4-piperidyl)ethyl]indole.

EXAMPLE X

1-[2-(1-ethyl-2-piperidyl)ethyl]-3-[2-(1-ethyl-4-piperidyl)ethyl]indole

The bis[(piperidyl)ethyl]indole derivative of Example IX obtained by the reducing step, is then reacted with acetaldehyde in the presence of formic acid in accordance with the procedure of Example V to give 1-[2-(1-ethyl-2-piperidyl)ethyl]-3-[2-(1-ethyl-4-piperidyl)ethyl]indole.

EXAMPLE XI

2-methyl-1,3-bis[2-(4-[1-b-phenylethyl]piperidyl)ethyl]indole

By heating under reflux a solution of 2-methyl-1,3-bis-[2-(4-piperidyl)ethyl]indole (6.6 g., 0.02 mole), phenethyl bromide (7.4 g., 0.04 mole) and triethylamine (4.4 g., 0.044 mole), in 100 ml. of xylene for 24–48 hours, the title compound is obtained.

EXAMPLE XII

2-methyl-1,3-bis[2-(4-[1-b-hydroxyethyl]piperidyl)-ethyl]indole

By treatment of a solution of 2-methyl-1,3-bis[2-(4-piperidyl)ethyl]indole (6.6 g., 0.02 mole) in benzene with ethylene oxide (1.8 g., 0.04 mole) for 2–3 days, the title compound is obtained.

EXAMPLE XIII

5-bromo-1,3-bis[2-(2-[1-benzoyl]piperidyl)ethyl]indole

Following the procedure of Example I, 5-bromo-3-[2-(2-pyridyl)ethyl]indole is reacted with 2-vinylpyridine to prepare 5-bromo-1,3-bis[2-(2-pyridyl)ethyl]indole. The latter compound is reduced by the method of Example IV to give 5-bromo-1,3-bis[2-(2-piperidyl)ethyl]indole. Using the procedure of Example X, the reduced product is then reacted with benzoyl chloride in the presence of triethylamine to give 5-bromo-1,3-bis[2-(2-[1-benzoyl]-piperidyl)ethyl]indole.

EXAMPLE XIV

2-phenyl-1,3-bis[2-(2-pyridyl)ethyl]indole

Again following the procedure of Example I, 2-phenyl-3-[2-(2-pyridyl)ethyl]indole is reacted with 2-vinylpyridine to give 2-phenyl-1,3-bis[2-(2-pyridyl)ethyl]indole.

We claim:

1. A compound selected from the group consisting of those having the formula:

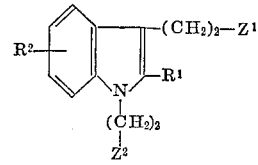

where $R^1$ is selected from the group consisting of hydrogen, lower alkyl and phenyl, $R^2$ is selected from the group consisting of hydrogen, lower alkyl, lower alkoxy, hydroxy and halogen; $Z^1$ and $Z^2$ are each selected from the group consisting of 2- and 4- pyridyl, and 2- and 4-piperidyl moieties having a structure selected from the following:

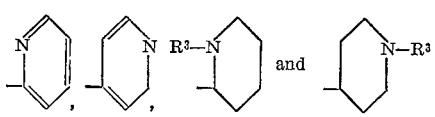

with the provisos that, when $Z^1$ is a pyridyl moiety, $Z^2$ is a pyridyl moiety, and when $Z^1$ is a piperidyl moiety, $Z^2$ is a piperidyl moiety; and wherein $R^3$ is selected from the group consisting of hydrogen, lower alkyl, β-phenethyl, benzoyl, and β-hydroxyethyl.

2. A compound as defined in claim 1 which is: 2-methyl-1,3-bis[2-(4-pyridyl)ethyl]indole.

3. A compound as defined in claim 1 which is: 1,3-bis [2-(4-pyridyl)ethyl]indole.

4. A compound as defined in claim 1 which is: 5-methoxy-1,3-bis[2-(4-pyridyl)ethyl]indole.

5. A compound as defined in claim 1 which is: 2-methyl-1,3-bis[2-(4-piperidyl)ethyl]indole.

6. A compound as defined in claim 1 which is: 2-methyl-1,3-bis[2-(1-methyl-4-piperidyl)ethyl]indole.

7. A compound as defined in claim 1 which is: 4-ethyl - 1 - [2-(2-pyridyl)ethyl]-3-[2-(4-pyridyl)ethyl]indole.

8. A compound as defined in claim 1 which is: 2-methyl - 1,3 - bis[2-(4-[1-b-phenylethyl]piperidyl)ethyl]indole.

9. A compound as defined in claim 1 which is: 2-methyl - 2,3-bis[2-(4-[1-b-hydroxyethyl]piperidyl)ethyl]indole.

10. A compound as defined in claim 1 which is: 5-bromo-1,3-bis[2-(2-[1-benzoyl]piperidyl)ethyl]indole.

References Cited

FOREIGN PATENTS 1,461,641   9/1966   France.

OTHER REFERENCES

Gray et al. Journal Organic Chemistry 26, 3368–72 (1961).

HENRY R. JILES, Primary Examiner

G. T. TODD, Assistant Examiner

U.S. Cl. X.R.

260—293.2, 294.7, 296, 999

PO-1050
(5/69)

UNITED STATES PATENT OFFICE
CERTIFICATE OF CORRECTION

Patent No. 3,462,441　　　　　　　　　　Dated August 19, 1969

Inventor(s) Meier E. Freed and John L. Archibald

It is certified that error appears in the above-identified patent and that said Letters Patent are hereby corrected as shown below:

Column 6, line 1, for "-2,3-bis" reads -- -1,3-bis--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents